(12) United States Patent
Bouvet

(10) Patent No.: US 9,560,681 B2
(45) Date of Patent: Jan. 31, 2017

(54) METHOD AND DEVICE FOR ESTABLISHING A COMMUNICATION

(71) Applicant: Orange, Paris (FR)

(72) Inventor: Bertrand Bouvet, Perros-Guirec (FR)

(73) Assignee: ORANGE, Paris (FR)

( * ) Notice: Subject to any disclaimer, the term of this patent is extended or adjusted under 35 U.S.C. 154(b) by 101 days.

(21) Appl. No.: 14/563,696

(22) Filed: Dec. 8, 2014

(65) Prior Publication Data
US 2015/0163838 A1 Jun. 11, 2015

(30) Foreign Application Priority Data

Dec. 6, 2013 (FR) ..................................... 13 62254

(51) Int. Cl.
*H04W 76/02* (2009.01)
*H04L 29/06* (2006.01)

(52) U.S. Cl.
CPC ........ *H04W 76/021* (2013.01); *H04L 65/1006* (2013.01); *H04L 65/1016* (2013.01); *H04L 65/1059* (2013.01); *H04L 65/1069* (2013.01); *H04L 69/24* (2013.01)

(58) Field of Classification Search
None
See application file for complete search history.

(56) References Cited

U.S. PATENT DOCUMENTS

| 2006/0218291 | A1 | 9/2006 | Zhu et al. | |
|---|---|---|---|---|
| 2010/0268826 | A1* | 10/2010 | Dahl | H04L 12/14 709/226 |
| 2013/0287016 | A1* | 10/2013 | Stille | H04L 65/1006 370/352 |
| 2014/0057667 | A1* | 2/2014 | Blankenship | H04L 67/303 455/500 |
| 2015/0055550 | A1* | 2/2015 | Suryavanshi | H04W 60/00 370/328 |
| 2015/0117444 | A1* | 4/2015 | Sandblad | H04L 65/1059 370/352 |

FOREIGN PATENT DOCUMENTS

WO 2010099829 A1 9/2010

OTHER PUBLICATIONS

French Search Report and Written Opinion dated Jul. 24, 2014 for corresponding French Application No. 13 62254, filed Dec. 6, 2013.
English translation of French Written Opinion dated Jul. 24, 2014 for corresponding French Application No. 1362254, filed Dec. 6, 2013.

* cited by examiner

*Primary Examiner* — Diane Lo
(74) *Attorney, Agent, or Firm* — David D. Brush; Westman, Champlin & Koehler, P.A.

(57) ABSTRACT

A method and a device establish a communication initiated by a terminal sending a communication request to a shared public identity associated with at least two destination terminals. The terminal sending the request receives at least one provisional response to the communication request, originating from one of the two destination terminals. From the provisional response received, the terminal sending the request obtains an address identifying the destination terminal that sent the provisional response received. The terminal sending the request sends a message to find out the capacities of a terminal to said destination terminal using the address obtained and receives in return a response message to the message to find out the capacities of a terminal originating from the destination terminal; the response message includes the capacities supported by the destination terminal. The terminal sending the request can thus display information representative of the capacities supported by the destination terminal.

8 Claims, 3 Drawing Sheets

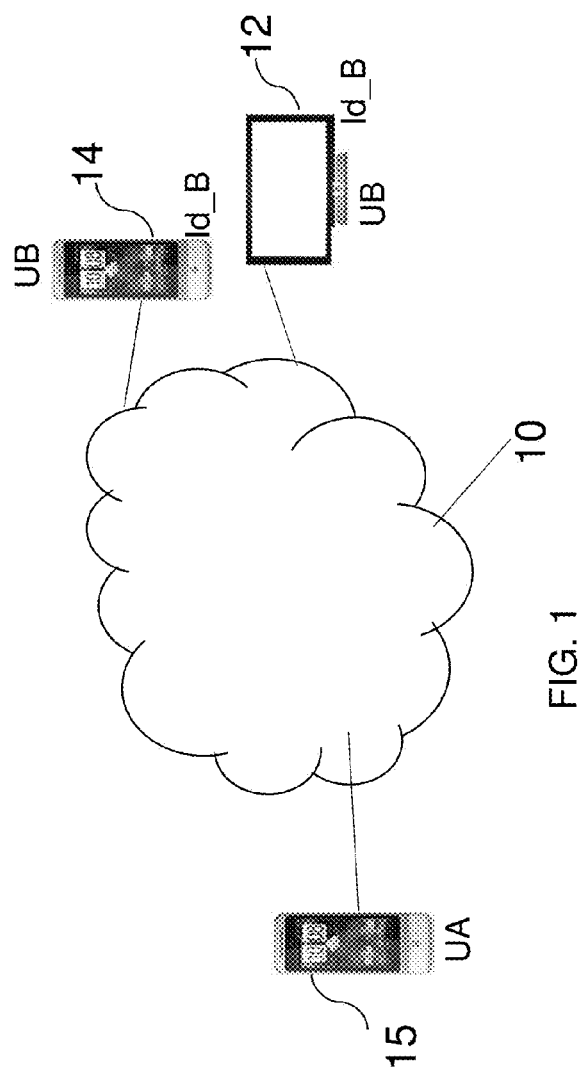
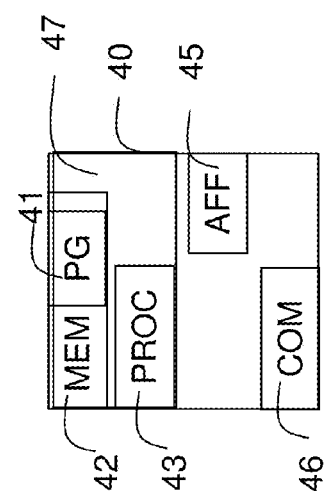
FIG. 1
FIG. 4

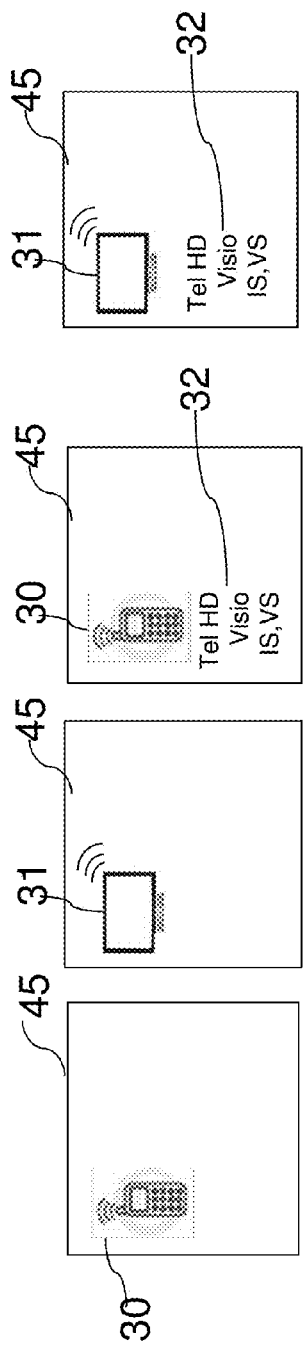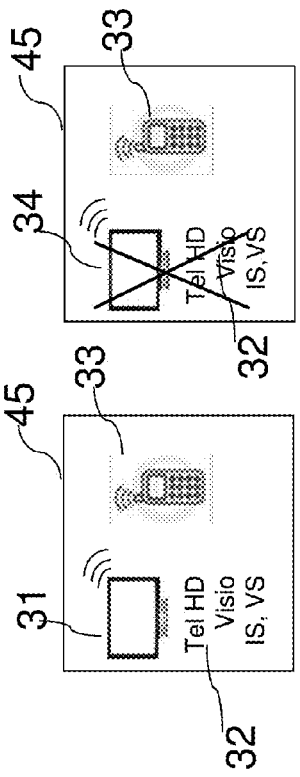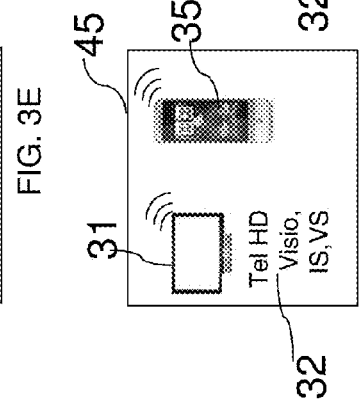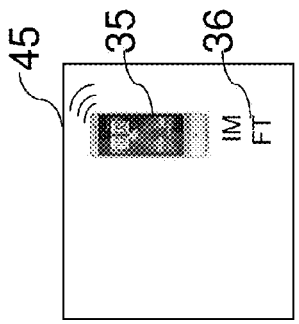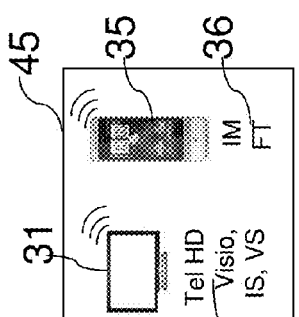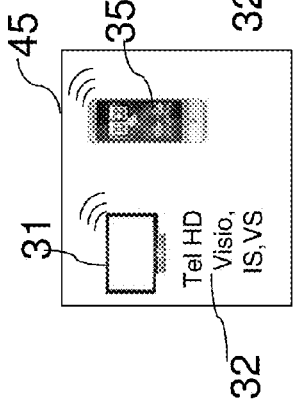

METHOD AND DEVICE FOR ESTABLISHING A COMMUNICATION

FIELD OF THE DISCLOSURE

The disclosure is in the field of telecommunications networks. It relates to a device and a method for establishing a communication between at least two terminals.

BACKGROUND OF THE DISCLOSURE

It is currently possible for a user to be contacted on several terminals via the same public identity. A public identity of a user, also called IMPU for IP (Internet Protocol) Multimedia Public Identity, corresponds for example to a telephone number assigned by an operator of a communications network, for example an IMS (for IP Multimedia Subsystem) communications network. The public identity assigned to a user allows other terminals to contact the terminal of this user in order to communicate. The user may associate several terminals with the same public identity. Thus, the user can be contacted, via this shared public identity, on any of the terminals which have been associated with this public identity.

Thus, when a caller terminal sends a communication request to the public identity of a user being called, for example by sending a message INVITE according to the SIP protocol (for Session Initiation Protocol), an S-CSCF (for Serving Call Session Control Function) server of the IMS communications network transmits the communication request to all the terminals registered in the IMS communications network with the corresponding public identity. The transmission of the communication request is carried out according to a mechanism called "forking". The IMS communications network transmits the communication request to all the terminals that have been associated with the public identity and which are connected to the IMS communications network.

The transmission of the communication request to all the terminals may be implemented in parallel or sequentially according to a priority assigned to each terminal associated with the corresponding public identity.

The "forking" mechanism has been described here in the framework of a network "forking" mechanism where the transmission of the communication request to all the terminals associated with the same public identity is implemented by an S-CSCF server of the IMS communications network. The network "forking" mechanism allows a communication request to be transmitted only to destination terminals supporting the SIP protocol.

An applications "forking" mechanism may also be implemented by an applications server of the IMS communications network on a principle similar to that of the network "forking" mechanism. The applications "forking" mechanism allows the communication request to be transmitted to any type of destination terminals supporting the SIP, GSM (Global System for Mobile communications) or RTC (Réseau Téléphonique Commuté) protocol. In the case of the applications "forking", the destination terminals can then have a different identity. Such destination terminals are then associated by the applications server with a same public identity. Thus, when the caller terminal sends a communication request to such a public identity, all the destination terminals associated to that public identity will receive the communication request.

Upon receiving the communication request, a terminal associated with the corresponding public identity rings in order to inform the user being called of the communication request. The terminal associated with the corresponding public identity also sends a provisional response to the terminal of the caller user, for example in the form of an SIP 180 Ringing message in order to trigger on the terminal of the caller user a ringing return. Each terminal associated with the corresponding public identity and connected to the IMS communications network at the time of the generation of the communication request receives the communication request.

The user being called can then take the communication with any of the terminals having received the communication request.

The mechanism ("forking") for transmission of the communication request to several terminals associated with the same public identity is transparent for the caller user. The caller user is not therefore aware that his/her communication request is being transmitted to several terminals. The caller user who sends a communication request is not therefore aware, for example, that another user is able to take the communication request if this other user is near to a terminal of the user being called. Or, according to another example, the caller user who sends a communication request does not know that his/her communication request has a high chance of a successful outcome since it is transmitted to several terminals of the user being called.

The RCS (for Rich Communication Suite) communications standard allows a user of an RCS compatible terminal to establish an enhanced communication with another user also in possession of an RCS compatible terminal.

Thus, a voice communication may notably be enhanced by the addition of a video stream to the communication, the sharing of video, audio files, text, etc.

In order for a caller user to be informed of the RCS capacities of the terminal of a user that he/she wishes to call, the terminal of the caller user displays for example to the caller user an enhanced address book comprising the RCS capacities of the terminal of a contact recorded in the address book. The terminal of the caller user regularly updates the RCS capacities of the contacts of the caller user recorded in the address book associated with the terminal of the caller user. For example, the update may be performed at each start-up, or every 24 hours, or at each selection of a contact in the address book. For this purpose, the terminal of the caller user sends to the public identity of each contact recorded in the address book a message to find out the capacities, for example an SIP OPTIONS message according to the SIP protocol. Each terminal of a contact, who has received an SIP OPTIONS message sent by the terminal of the caller user, responds by sending to the terminal of the caller user an SIP 200OK message notably comprising the RCS capacities supported by the terminal of the contact.

The caller user is thus informed of the RCS capacities supported by the terminal of a contact with which he/she wishes to communicate. However, the RCS capacities of the terminal of a contact of the caller user which are stored in the address book of the caller user are not necessarily up to date at the time when the caller user sends a communication request to the terminal of the contact.

Moreover, when a contact of the caller user possesses several terminals associated with the same shared public identity, the SIP OPTIONS message sent by the terminal of the caller user to the shared public identity of the contact is then transmitted by the S-CSCF server of the IMS communications network to all the terminals of the contact associated with said shared public identity according to the "forking" mechanism which is implemented by the IMS communications network. When each terminal of the contact associated with said shared public identity of the contact that has received the SIP OPTIONS message responds by the sending of an SIP 200OK message comprising the RCS capacities supported by the terminal of the contact, the IMS communications network filters the responses sent by the terminals of the contact and only transmits the first SIP 200OK message sent to the terminal of the caller user in response to the SIP OPTIONS message sent by the terminal of the caller user.

The terminal of the caller user is not therefore aware of all of the RCS capacities of the terminals associated with the shared public identity of the contact. The terminal of the caller user is only aware of the RCS capacities supported by the terminal which has responded first to the SIP OPTIONS message. However, the terminal which has responded first to the SIP OPTIONS message is not necessarily that possessing the most appropriate RCS capacities. For example, the terminal which has responded first may indicate that it does not support the addition of video streaming within the voice communication. However, the user being called may have another terminal supporting the addition of video streaming within the voice communication. If the caller user wished to use this functionality during a communication with the user being called, he/she may then decide not to establish a communication with the user being called. The terminal of the caller user thus displays to the caller user RCS capacities relating to the user being called that are incomplete.

Thus, when the caller user sends a communication request to the public identity of a contact, the RCS capacities associated with the contact which are stored in the address book of the caller user are not necessarily up to date.

Moreover, if the contact disposes of several terminals associated with the same public identity, the RCS capacities associated with the contact that are stored in the address book of the caller user are not representative of the RCS capacities supported by all the terminals to which the communication request is transmitted by the communications network and which are able to respond to the communication request.

Moreover, if the contact disposes of several terminals associated with the same public identity, the caller user is not aware that his/her communication request is transmitted to several terminals.

SUMMARY

An exemplary aspect of the present disclosure relates to a method for establishing a communication initiated by a terminal sending a communication request to a shared public identity which is associated with at least one first and one second destination terminal. The method comprises the following steps performed by the terminal sending the request:
  a step for sending the communication request to the shared public identity, said communication request being received by at least said first and said second destination terminal,
  following the reception of at least one first provisional response to the communication request, originating from said first destination terminal, and one second provisional response to the communication request originating from sais second destination terminal, for each first and second provisional response received:
    i. a step for obtaining, from the provisional response received, an address identifying the destination terminal which has sent the provisional response received,
    ii. a step for sending a message to find out the capacities of a terminal to said destination terminal using the address obtained,
    iii. a step for receiving a response message to the message to find out the capacities of a terminal, originating from the destination terminal, said response message comprising the capacities supported by the destination terminal,
  a step for displaying information representative of the capacities supported by the first destination terminal and information representative of the capacities supported by the second destination terminal.

The method for establishing a communication according to an exemplary embodiment thus allows a terminal sending a communication request to be informed of the capacities of a terminal capable of taking the communication requested. According to an embodiment, a message to find out the capacities of a terminal is sent during the call establishment phase, prior to the communication between the terminal sending the request and a destination terminal being established.

The message to find out the capacities of a terminal is for example an SIP OPTIONS message of the SIP protocol. The capacities notably correspond to the RCS capacities supported by the destination terminal.

Advantageously, the steps of the method according to an embodiment are implemented during a dialog, referred to as "early dialog" according to the SIP protocol. An "early dialog" is defined by the transmission of a communication request by the terminal sending the request to a public identity, then by the reception of a provisional response to the communication request, the provisional response being sent by a terminal associated with the public identity and having received the communication request. Thus, the provisional response to the communication request received by the terminal sending the request is advantageously used in order to obtain an address allowing a direct communication with the destination terminal having sent this provisional response. Indeed, before the reception of the provisional response, the terminal sending the request has no other means for communicating with the terminals associated with the shared public identity other than by sending a message to the shared public identity, which then triggers the "forking" mechanism of the IMS communications network.

In the prior art, when the SIP OPTIONS message is sent after the establishment of the communication with a terminal associated with the shared public identity, the terminal sending the request then only has access to the address of the terminal associated with the shared public identity having taken the communication and hence only to the capacities of this terminal alone.

The sending of the message to find out the capacities during the call establishment phase following the reception of a provisional response thus allows the capacities of a terminal able to take the communication, in other words a terminal associated to the shared public identity connected to the communications network, to be obtained.

Advantageously, the sending of the message to find out the capacities to a destination terminal is carried out when at least two provisional responses to the communication request have been received by the terminal sending the request. Thus, the resources of the communications network are optimized, notably the bandwidth needed for the transmission of the signaling messages for establishing a communication and the resources of the servers of the communications network core via which the signaling messages for establishing a communication transit.

Thanks to an exemplary embodiment, the user of the terminal sending the request is informed, before the establishment of the communication, of the RCS capacities of the destination terminals with which the terminal sending the request is able to establish the communication.

Thus, if the RCS capacities of the destination terminals with which the terminal sending the request is able to establish the communication are not suitable for the user of the terminal sending the request, the user of the terminal sending the request may decide to cancel the communication request and to postpone his/her call. Depending on the RCS capacities of the destination terminals that are returned to the user of the terminal sending the request, the user of the terminal sending the request may also decide to use another means of communication or another terminal in order to communicate with one of the destination terminals.

An exemplary embodiment is advantageous with respect to a more costly solution using a server implemented within the communications network and which would take an average of the responses comprising the capacities of all the terminals associated with a shared public identity. Indeed, an embodiment allows only the capacities of the terminals capable of taking the communication to be obtained. An exemplary embodiment avoids the provision of information not useful to the user of the terminal sending the request and allows only the terminals connected to the communications network at the time of the sending of the communication request and which reply to the communication request, hence ostensibly free to communicate with the terminal sending the request, to be taken into account.

The various embodiments or features mentioned hereinafter may be added, independently or in combination with one another, to the steps of the method defined hereinabove.

According to one particular embodiment, the message to find out the capacities comprises a parameter to identify one dialog between the terminal sending the request and the destination terminal, said parameter being different from a parameter to identify one dialog comprised in the communication request. According to this particular embodiment, the terminal sending the communication request identifies dialogs initiated during the communication setup stage with destination terminals.

According to another particular embodiment, the method for establishing a communication furthermore comprises:
  a step for obtaining, from the provisional response received, information representative of a type of terminal corresponding to the type of the destination terminal having sent the provisional response received,
  a step for displaying said information representative of the type of the destination terminal, simultaneously with the display of the information representative of the capacities supported by the destination terminal.

According to this particular embodiment, in addition to the capacities of the terminal to which the communication request is addressed, the user of the terminal sending the request is informed of the type of the terminal capable of taking the communication requested. For example, the terminal sending the request can display an icon representative of the type of the destination terminal. The type of the destination terminal may be an on-line television, a high-definition telephone, a tablet, a mobile telephone, a landline telephone, etc.

The caller user thus knows which type of terminal is used to implement the RCS capacities. The caller user can therefore evaluate the drawbacks and the advantages of using such and such RCS capacities with such a type of terminal. For example, if the destination terminal is a television, the addition of video with a low data rate may produce a low-quality reproduction on the destination terminal. The caller user may then decide to postpone his/her call until later on or not to activate the addition of the video during the communication.

According to another particular embodiment, the second provisional response is received after a given interval of time after the sending of the communication request. The display of the information representative of the capacities supported by the first destination terminal is then modified simultaneously to the display of information representative of the capacities supported by the second destination terminal in order to indicate that the first destination terminal does not ring anymore.

According to this particular embodiment, the "forking" mechanism is sequential, in other words the communication request is transmitted by the communications network, as a first stage, to the first destination terminal associated with said shared public identity, then if the first destination terminal has not established the communication with the terminal sending the request, after a given interval of time, for example 20 seconds, the communication request is transmitted to the second destination terminal.

The terminal sending the request then modifies the display of the information representative of the capacities supported by the first destination terminal in order to inform the caller user that the first destination terminal is no longer able to take the communication after the given interval of time.

According to another particular embodiment, the display of the information representative of the capacities supported by the first destination terminal is then carried out simultaneously with the display of the information representative of the capacities supported by the second destination terminal.

This particular embodiment is advantageous when the "forking" mechanism is simultaneous, in other words the communication request is transmitted by the communications network to the first destination terminal associated with said shared public identity and to the second destination terminal associated with said shared public identity simultaneously. The simultaneous display of the information representative of the capacities supported by the first destination terminal and of the information representative of the capacities supported by the second destination terminal allows the caller user to be informed that several destination terminals are able to take the communication.

An aspect of the disclosure also relates to a device for establishing a communication initiated by a terminal sending a communication request to a shared public identity associated with at least two destination terminals. The device comprises:
  means, which are activated following the reception of at least one provisional response to the communication request originating from one of the at least two destination terminals, for obtaining, from the provisional response received, an address identifying the destination terminal having sent the provisional response,
  means for sending a message to find out the capacities of a terminal to said destination terminal using the address obtained,
  means for receiving a response message to the message to find out the capacities of a terminal, originating from the destination terminal, said response message comprising the capacities supported by the destination terminal, means for displaying information representative of the capacities supported by the destination terminal.

According to one particular embodiment, such a device is included in a terminal.

In one particular embodiment, the various steps of the method for establishing a communication are implemented by computer program instructions.

Consequently, an aspect of the disclosure is also aimed at computer programs on an information medium, these programs being capable of being respectively implemented in a terminal or, more generally, in a computer, these programs respectively comprising instructions designed for the implementation of the various steps of the method for establishing a communication which has just been described.

These programs can use any given programming language, and may take the form of source code, object code, or of a code intermediate between source code and object code, such as in a partially compiled form, or in any other desired form.

An aspec of the disclosure is also aimed at an information medium readable by a computer, and comprising instructions of a computer program such as mentioned hereinabove.

The information medium may be any given entity or device capable of storing the program. For example, the medium can comprise a storage means, such as a ROM, for example a CD ROM or a microelectronic circuit ROM, or else a magnetic or electronic recording means, for example a USB memory stick or a hard disk.

On the other hand, the information medium may be a transmissible medium such as an electrical or optical signal, which may be routed via an electrical or optical cable, by radio or by other means. The program according to an aspect of the disclosure may, in particular, be uploaded onto a network of the Internet type.

Alternatively, the information medium can be an integrated circuit into which the program is incorporated, the circuit being designed to execute or to be used in the execution of the method for establishing a communication in question.

The advantages of the device for establishing a communication, of the terminal included in such a device and of the computer program comprising instructions designed for the implementation of the various steps of the method for establishing a communication are identical to those presented in relation with the method for establishing a communication according to any one of the particular embodiments mentioned hereinabove.

BRIEF DESCRIPTION OF THE DRAWINGS

Other advantages and features will become more clearly apparent upon reading the following description of one particular embodiment, presented simply by way of illustrative and non-limiting example, and the appended drawings, amongst which:

FIG. 1 illustrates an environment for implementation of a particular embodiment, FIGS. 3A to 3I illustrate examples of the displaying of information representative of the capacities supported by a destination terminal according to particular embodiments, FIG. 4 illustrates a device designed to implement steps of the method for establishing a communication according to one particular embodiment.

DETAILED DESCRIPTION OF ILLUSTRATIVE EMBODIMENTS

Figure 2:
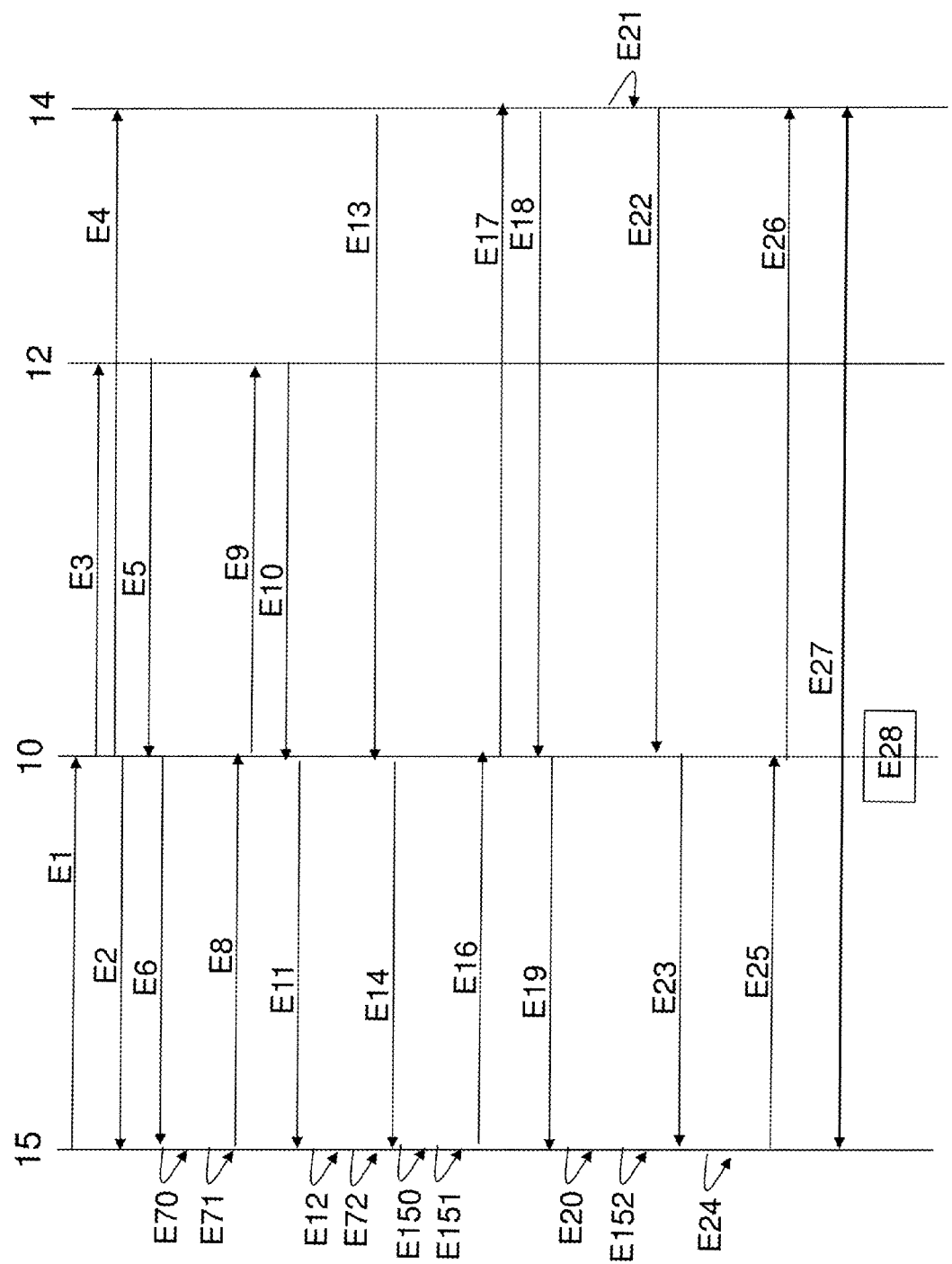
FIG. 2 illustrates steps of the method for establishing a communication according to one particular embodiment.

FIG. 1 illustrates an environment for implementation of an aspect of the disclosure according to one particular embodiment.

The environment shown in FIG. 1 comprises a communications network 10 to which terminals 12, 14 and 15 are connected.

The communications network 10 can be a mobile communications network of the type GSM, EDGE, 3G, 3G+, 4G, etc., or a fixed communications network of the type ADSL, fiber, VDSL, WiFi, etc.

It can be implemented by an architecture of the RCS type. The communications network 10 may also be an IP communications network implemented by a VoIP (for Voice over IP) network architecture of the IMS type or any other network architecture.

The communications network 10 may correspond to a group of communications networks of various operators interconnected together via interconnection servers (not shown).

The terminals 12, 14 and 15 may be any type of terminals allowing communication sessions of the telephone, videophone, instant voicemail, white board, etc. type to be established. The terminals 12, 14 and 15 correspond for example to a mobile telephone, a smartphone, a tablet, a television connected to a communications network, or a personal computer.

In the example described here, the terminal 15 is a terminal associated with a user UA and the terminals 12 and 14 are terminals associated with a user UB. The terminals 12, 14 and 15 are connected to the communications network 10 and can send and receive any type of communications via the communications network 10.

In a known manner, the user UB has associated the terminals 12 and 14 with the same public identity Id_B. The public identity Id_B allows for example the user UA to contact the user UB in order to establish a communication between the terminal 15 of the user UA and a terminal 12 or 14 of the user UB. The association of the terminals 12 and 14 with the public identity Id_B is stored in the communications network 10.

When the user UA wishes to communicate with the user UB, the terminal 15 of the user UA sends a communication request to the public identity Id_B of the user UB. The communication request is for example sent in the form of an SIP INVITE message according to the SIP protocol. The communications network 10 implements a "forking" mechanism which transmits the communication request sent by the terminal 15 to the terminals 12 and 14 of the user UB. The transmission of the communication request to the terminals 12 and 14 may be sequential or simultaneous according to a priority allocated to the terminals 12 and 14. For example, such a priority corresponds to the parameter q of a terminal defined in the standard RFC3261 of the IETF (for Internet Engineering Task Force). The parameter q of a terminal may be allocated a value in the range between 0.0 and 1.0. The value 1.0 corresponds to the highest priority. The value of the parameter q of a terminal is supplied to the communications network 10 when the terminal is registered in the communications network. Thus, if the parameter q of the terminal 14 has a value 1.0 assigned to it and the parameter q of the terminal 12 has the value 0.0 assigned to it, the "forking" mechanism is sequential. The communication request sent by the terminal 15 is initially transmitted to the terminal 14 by the communications network 10. Then, if the terminal 14 does not establish the communication requested with the terminal 15, the communications network 10 transmits the communication request to the terminal 12 and cancels the transmission of the communication request to the terminal 14.

If the parameter q of the terminals 14 and 12 has the same value assigned to it, for example 1.0, the "forking" mechanism is simultaneous. The communication request sent by the terminal 15 is transmitted simultaneously to the terminals 12 and 14 by the communications network 10.

Similarly, when the user UA wishes to know the capacities with which he/she can communicate with the user UB, the terminal 15 sends an SIP OPTIONS message to the public identity Id_B of the user UB. The communications network 10 then implements the "forking" mechanism.

The SIP OPTIONS message is transmitted simultaneously to the terminals 12 and 14 by the communications network 10. Upon receiving the SIP OPTIONS message, the terminal 14 then responds to the terminal 15 by sending an SIP 200OK message notably comprising the capacities supported by the terminal 14. Upon receiving the SIP OPTIONS message, the terminal 12 then responds to the terminal 15 by sending an SIP 200OK message notably comprising the capacities supported by the terminal 12. The communications network 10 filters the SIP 200OK messages originating from terminals 12 and 14. The communications network 10 only transmits to the terminal 15 the first SIP 200OK message received originating from the public identity Id_B, for example the SIP 200OK message sent by the terminal 12.

It is thus apparent that the terminal 15 does not know in detail the capacities supported by all the terminals of the user UB.

Thus, when the terminal 15 sends a communication request to the public identity Id_B, the user UA of the terminal 15 does not know the capacities supported by the terminals of the user UB that are able to take the communication requested.

FIG. 2 describes the steps of the method for establishing a communication implemented according to one particular embodiment. The method for establishing a communication is for example implemented by the terminal 15 in FIG. 1.

During a step E1, the terminal 15 sends a communication request to the public identity Id_B in order to communicate with a terminal of the user UB. The communication request is for example sent in the form of an SIP INVITE message according to the SIP protocol. The SIP INVITE message notably comprises:

in a field called "CallID", a series of characters identifying the communication requested, in an address field for the generator of the communication request, called "From", the address of the terminal 15 comprising a public identity associated with the terminal 15 and a field called "Tag" identifying the terminal 15. The "Tag" field is added by the terminal 15 to the public identity associated with the terminal 15.

in an address field for the correspondent of the communication request, called "To", the public identity Id_B of the user UB, in a correspondent SIP address field, called "R-URI" for Request Uniform Resource Identifier, the public identity Id_B of the user UB, in a field called SDP (for Session Description Protocol), a list of session parameters relating to the terminal 15, such as the audio or video codecs supported by the terminal 15 and the IP addresses and connection ports used by the terminal 15 for receiving and sending the media data stream of the communication.

During the step E1, the communication request is received by the communications network 10.

During a step E2, following the reception by the communications network 10 of the SIP INVITE message, the communications network 10 sends an SIP 100 Trying message to the terminal 15. The SIP 100 Trying message indicates to terminal 15 that the communication request has been received by the communications network 10 and that it is being processed.

During a step E3, respectively E4, the communications network 10 transmits to the terminal 12, respectively 14, the SIP INVITE message received in the step E1. According to the priority assigned to the terminals 12 and 14, the steps E3 and E4 may be carried out simultaneously or sequentially separated by a given interval of time, for example 20 seconds.

During a step E5, following the reception of the SIP INVITE message in the step E3, the terminal 12 triggers a ringing sound in order to alert the user UB to the communication request. During the step E5, the terminal 12 sends an SIP 180 Ringing message for the attention of the terminal 15. The SIP 180 Ringing message sent by the terminal 12 notably comprises:

in a "CallID" field, the series of characters identifying the communication requested identical to the value of the "CallID" field of the SIP INVITE message received, in a "To" field, the address of the terminal 12 comprising the public identity Id_B and a "Tag" field identifying the terminal 12. The "Tag" field is added by the terminal 12 to the public identity Id_B associated with the terminal 12.

in a "From" field, the address of the terminal 15 contained in the "From" field of the SIP INVITE message.

During the step E5, the SIP 180 Ringing message sent by the terminal 12 is received by the communications network 10.

During a step E6, the communications network 10 sends, to the terminal 15, the SIP 180 Ringing message received in the step E5. During the step E6, the terminal 15 receives the SIP 180 Ringing message sent by the terminal 12. The SIP 180 Ringing message constitutes a provisional response to the communication request originating from a terminal to which the communication request is addressed, i.e. the terminal 12.

The reception of the SIP 180 Ringing message originating from the terminal 12 triggers, on the terminal 15, a step E70 for obtaining an address identifying the destination terminal having sent the SIP 180 Ringing message. The terminal 15 obtains the address identifying the terminal 12 from the "To" field of the SIP 180 Ringing message comprising the public identity Id_B and the "Tag" field added by the terminal 12.

During the step E70, the terminal 15 also triggers a ringing return indicating to the user UA that the terminal 12 is ringing.

According to one particular embodiment, during the step E70, the terminal 15 displays visually to the user UA that the terminal 12 is ringing. This visual display is for example illustrated in FIG. 3A. FIG. 3A shows a screen 45 of the terminal 15 displaying an icon 30 representing a terminal receiving a call.

According to another particular embodiment, during a step E71, the terminal 15 obtains from the SIP 180 Ringing message received, originating from the terminal 12, information representative of the type of the terminal 12. The terminal 15 obtains the information representative of the type of the terminal 12 from a field called "Server" of a header called "Header SIP" of the SIP 180 Ringing message. The "Server" field may notably comprise the name of the manufacturer of the terminal having generated the SIP 180 Ringing message, the type of terminal and the software version of the SIP protocol used. In the example illustrated in FIG. 1, the terminal 12 is a television connected to the communications network 10. During the step E71, the terminal 15 visually displays to the user UA information indicating the type of the terminal 12. This visual display is for example illustrated in FIG. 3B. FIG. 3B shows a screen 45 of the terminal 15 displaying an icon 31 representing a television receiving a call.

During a step E8, following the step E70, the terminal 15 sends an SIP OPTIONS message for the attention of the terminal 12 in order to obtain the capacities supported by the terminal 12. The SIP OPTIONS message sent by the terminal 15 constitutes a message to find out the capacities of the terminal 12.

The sending of the SIP OPTIONS message to the terminal 12 is carried out thanks to the address identifying the terminal 12 obtained from the SIP 180 Ringing message in the step E70. The address identifying the terminal 12 comprises the public identity of the user UB and the "Tag" field added by the terminal 12.

The SIP OPTIONS message sent by the terminal 15 to the terminal 12 notably comprises:
  in a "CallID" field, a series of characters identifying the dialog between the terminal 15 and the terminal 12, for example the value of the "CallID" field of the SIP INVITE message sent by the terminal 15 during the step E1 incremented by 1,
  in a "To" field, the address identifying the terminal 12 comprising the public identity Id_B and the "Tag" field identifying the terminal 12.
  in a "From" field, the address of the terminal 15 contained in the "From" field of the SIP INVITE message sent by the terminal 15 during the step E1.

In the SIP OPTIONS message a "CallID" field must be used that is different from the "CallID" field of the SIP INVITE message sent during the step E1. The reason for this is that the "CallID" field allows a dialog, or exchanges of messages between two terminals, to be identified. In an exemplary embodiment of the disclosure, the terminal 15 is able to exchange messages during the phase for establishing a communication with several different terminals. It is therefore necessary for the terminal 15 to be able to identify, in a unique manner, the messages received and sent to and from a particular terminal. The "CallID" field of the SIP OPTIONS message sent to the terminal 12 is therefore assigned the value of the "CallID" field of the SIP INVITE message sent by the terminal 15 during the step E1 incremented by 1. Any other method for supplying another value of the "CallID" field in the SIP OPTIONS message may be envisioned.

During the step E8, the communications network 10 receives the SIP OPTIONS message sent by the terminal 15.

During a step E9, the communications network 10 sends, to the terminal 12, the SIP OPTIONS message received in the step E8. During the step E9, the terminal 12 receives the SIP OPTIONS message sent by the terminal 15 in the step E8.

During a step E10, the terminal 12 responds to the SIP OPTIONS message received during the step E9 by sending an SIP 200OK message to the terminal 15. The SIP 200OK message notably comprises:
  in a "CallID" field, the series of characters identifying the dialog between the terminal 15 and the terminal 12 identical to the value of the "CallID" field of the SIP OPTIONS message sent by the terminal 15 during the step E8,
  in a "To" field, the address identifying the terminal 12 comprising the public identity Id_B and the "Tag" field identifying the terminal 12.
  in a "From" field, the address of the terminal 15 contained in the "From" field of the SIP INVITE message sent by the terminal 15 during the step E1,
  in a "Contact" field of a header called "Header SIP", the list of the functionalities supported by the terminal 12, notably the capacities according to the RCS protocol. The list of the functionalities is inserted in a known manner into the SIP 200OK message.

During the step E10, the communications network 10 receives the SIP 200OK message sent by the terminal 12.

During a step E11, the communications network 10 sends, to the terminal 15, the SIP 200OK message received in the step E10. During the step E11, the terminal 15 receives the SIP 200OK message sent by the terminal 12 in the step E10.

The terminal 15 having sent an SIP INVITE message during the step E1, the terminal 15 is waiting for an SIP 200OK message in response to the SIP INVITE message. The terminal 15 must therefore be able to identify an SIP 200OK message received in response to an SIP INVITE message or to an SIP OPTIONS message. The terminal 15 identifies the SIP 200OK message received during the step E11 as being the response to the SIP OPTIONS message sent during the step E8 based on the value of the "CallID" field contained in the SIP 200OK message. The value of the "CallID" field of the SIP 200OK message received during the step E11 is identical to the value of the "CallID" field sent during the step E8. The value of the "CallID" field thus allows a dialog, in other words an exchange of messages, between the terminals 15 and 12, to be identified.

In a step E12, the terminal 15 then displays for the user UA the capacities supported by the terminal 12. The capacities supported by the terminal 12 are obtained by the terminal 15 based on the SIP 200OK message received in the step E11, for example from the list of the functionalities indicated in the "Contact" field.

The display is for example illustrated in FIG. 3C. FIG. 3C shows a screen 45 of the terminal 15 displaying an icon 30 representing a terminal receiving a call and series of characters 32 indicating the functionalities supported by the terminal represented by the icon 30. According to this example, the terminal 12 supports the communication functionality of the voice type in high-definition quality (HD Tel), the communication functionality as a videophone (Video), the RCS image sharing capacity (IS) and the RCS video sharing capacity (VS).

According to one particular embodiment, during a step 72, the terminal 15 displays the information on the type of the terminal 12 simultaneously with the display of the functionalities supported by the terminal 12 carried out during the step E12.

The display is for example illustrated in FIG. 3D. FIG. 3D shows a screen 45 of the terminal 15 displaying an icon 31 representing a television receiving a call and series of characters 32 indicating the functionalities supported by the terminal represented by the icon 31. According to this example, the terminal 12 supports the communication functionality of the voice type in high-definition quality (HD Tel), the communication functionality as a videophone (Visio), the RCS image sharing capacity (IS) and the RCS video sharing capacity (VS).

In a step E13, following the reception of the SIP INVITE message during the step E4, the terminal 14 triggers a sound in order to alert the user UB to the communication request. During the step E13, the terminal 14 sends, to the terminal 15, an SIP 180 Ringing message. The SIP 180 Ringing message sent by the terminal 14 notably comprises:

- in a "CallID" field, the series of characters identifying the communication requested identical to the value of the "CallID" field of the SIP INVITE message received,
- in a "To" field, the address of the terminal 14 comprising the public identity Id_B and a "Tag" field identifying the terminal 14. The "Tag" field is added by the terminal 14 to the public identity Id_B associated with the terminal 14.
- in a "From" field, the address of the terminal 15 contained in the "From" field of the SIP INVITE message.

During the step E13, the SIP 180 Ringing message sent by the terminal 14 is received by the communications network 10.

In a step E14, the communications network 10 sends, to the terminal 15, the SIP 180 Ringing message received in the step E13. During the step E14, the terminal 15 receives the SIP 180 Ringing message sent by the terminal 14. The SIP 180 Ringing message constitutes a provisional response to the communication request originating from a terminal to which the communication request is addressed, here the terminal 14.

The reception of the SIP 180 Ringing message originating from the terminal 14 triggers a step E150 on the terminal 15 for obtaining an address identifying the destination terminal having sent the SIP 180 Ringing message. The terminal 15 obtains the address identifying the terminal 14 from the "To" field of the SIP 180 Ringing message comprising the public identity Id_B and the "Tag" field added by the terminal 14.

Since the terminal 15 has already triggered a ringing return during the step E70, following the reception of the first provisional response SIP 180 Ringing originating from the terminal 12, the terminal 15 does not trigger any other ringing return.

According to one particular embodiment, during the step E150, the terminal 15 visually displays to the user UA that the terminal 14 is ringing. The visual display is for example illustrated in FIG. 3E. FIG. 3E shows a screen 45 of the terminal 15 displaying an icon 33 representing a terminal receiving a call.

According to one particular embodiment, the step E150 is carried out simultaneously with the step E70 or with the step E72. Thus, the user UA is informed that at least two terminals associated with the public identity Id_B have received the communication request sent in the step E1. According to this particular embodiment, the FIG. 3E also shows an icon 31 representing an on-line television receiving a call and series of characters 32 indicating the capacities supported by the terminal 12 represented by the icon 31.

According to another particular embodiment, in a step E151, the terminal 15 obtains, from the SIP 180 Ringing message received originating from the terminal 14, information representative of the type of the terminal 14. The terminal 15 obtains the information representative of the type of the terminal 14 from the "Server" field of the header "Header SIP" of the SIP 180 Ringing message. In the example illustrated in FIG. 1, the terminal 14 is a mobile terminal of the smartphone type. During the step E151, the terminal 15 visually displays to the user UA information indicating the type of the terminal 14. This visual display is for example illustrated in FIG. 3G. FIG. 3G shows a screen 45 of the terminal 15 displaying:

- an icon 31 representing an on-line television receiving a call and series of characters 32 indicating the capacities supported by the terminal 12 represented by the icon 31, and
- an icon 35 representing a mobile terminal receiving a call.

During a step E16, following the step E150, the terminal 15 sends an SIP OPTIONS message to the terminal 14 in order to obtain the capacities supported by the terminal 14. The SIP OPTIONS message sent by the terminal 15 constitutes a message to find out the capacities of the terminal 14.

The sending of the SIP OPTIONS message to the terminal 14 is carried out thanks to the address identifying the terminal 14 obtained from the SIP 180 Ringing message in the step E150. The address identifying the terminal 14 comprises the public identity of the user UB and the "Tag" field added by the terminal 14.

The SIP OPTIONS message sent by the terminal 15 to the terminal 14 notably comprises:

- in a "CallID" field, a series of characters identifying the dialog between the terminal 15 and the terminal 14, for example the value of the "CallID" field of the SIP INVITE message sent by the terminal 15 during the step E1 incremented by 2,
- in a "To" field, the address identifying the terminal 14 comprising the public identity Id_B and the "Tag" field identifying the terminal 14.
- in a "From" field, the address of the terminal 15 contained in the "From" field of the SIP INVITE message sent by the terminal 15 during the step E1.

During the step E16, the communications network 10 receives the SIP OPTIONS message sent by the terminal 15.

In a step E17, the communications network 10 sends to the terminal 14 the SIP OPTIONS message received in the step E16. During the step E17, the terminal 14 receives the message SIP OPTIONS sent by the terminal 15 in the step E16.

During a step E18, the terminal 14 responds to the SIP OPTIONS message received during the step E17 by sending an SIP 200OK message to the terminal 15. The SIP 200OK message notably comprises:

- In a "CallID" field, the series of characters identifying the dialog between the terminal 15 and the terminal 14 identical to the value of the "CallID" field of the SIP OPTIONS message sent by the terminal 15 during the step E16,
- In a "To" field, the address identifying the terminal 14 comprising the public identity Id_B and the "Tag" field identifying the terminal 14.
- In a "From" field, the address of the terminal 15 contained in the "From" field of the SIP INVITE message sent by the terminal 15 during the step E1,
- In a "Contact" field of a header called "Header SIP", the list of the functionalities supported by the terminal 14, notably the capacities according to the RCS protocol. The list of the functionalities is inserted in a known manner into the SIP 200OK message.

During the step E18, the communications network 10 receives the SIP 200OK message sent by the terminal 14.

In a step E19, the communications network 10 sends, to the terminal 15, the SIP 200OK message received in the step E18. During the step E19, the terminal 15 receives the SIP 200OK message sent by the terminal 14 in the step E18. The terminal 15 identifies the SIP 200OK message received during the step E19 as being the response to the SIP OPTIONS message sent during the step E16 based on the value of the "CallID" field contained in the SIP 200OK message. The value of the "CallID" field of the SIP 200OK message received during the step E19 is identical to the value of the "CallID" field sent during the step E16. The value of the "CallID" field thus allows a dialog between the terminals 15 and 14 to be identified.

In a step E20, the terminal 15 then displays to the user UA the capacities supported by the terminal 14. The capacities supported by the terminal 14 are obtained by the terminal 15 from the SIP 200OK message received in the step E19, for example from the list of the functionalities indicated in the "Contact" field. The display is effected for example in a similar manner to that illustrated in FIG. 3C.

According to one particular embodiment, during a step E152, the terminal 15 displays the information on the type of the terminal 14 simultaneously with the display of the functionalities supported by the terminal 14 carried out during the step E20. The display is for example carried out in a similar manner to that illustrated in FIG. 3D.

According to one particular embodiment, in the step E152, the terminal 15 visually displays to the user UA information on the type of the terminal 14 and the capacities supported by the terminal 14 simultaneously with the information on the type of the terminal 12 and the capacities supported by the terminal 12. The display is for example illustrated in FIG. 3H. FIG. 3H shows a screen 45 of the terminal 15 displaying:
- an icon 31 representing a television receiving a call (terminal 12) and series of characters 32 indicating the functionalities supported by the terminal 12 represented by the icon 31. According to this example, the terminal 12 supports the communication functionality of the voice type in high-definition quality (HD Tel), the communication functionality as a videophone (Video), the RCS image sharing capacity (IS) and the RCS video sharing capacity (VS)
- an icon 35 representing a smartphone receiving a call (terminal 14) and series of characters 36 indicating the functionalities supported by the terminal 14 represented by the icon 35. According to this example, the terminal 14 supports the RCS capacities for instant messaging (IM) and for file sharing (FT).

According to one particular embodiment, the steps E70, E8 and E12 are only implemented when the terminal 15 receives at least a second provisional response, for example of the SIP 180 Ringing type, originating from a terminal associated with the public identity Id_B different from the terminal 12. According to this embodiment, the steps E70, E8 and E12 are then only implemented by the terminal 15 following the step E14 for receiving an SIP 180 Ringing message sent by the terminal 14 during the step E13.

According to another particular embodiment, the SIP 180 Ringing message received by the terminal 15 during the step E14 is received after a given interval of time after the SIP INVITE message is sent during the step E1. This given interval of time corresponds for example to 5 ringing tones or 20 seconds. In this particular embodiment, during the step E150 or during the step E20, the display of the information representative of the capacities supported by the terminal 12 is modified. The modification is for example illustrated by the change of display by the terminal 15 from an image illustrated in FIG. 3D to an image illustrated in FIG. 3F. FIG. 3D represents the terminal 12 receiving the communication request. FIG. 3F shows the same elements as FIG. 3D, but the elements 34 and 32 representing the characteristics of the terminal 12 are crossed out. FIG. 3F also shows an icon 33 representing the terminal 14 receiving a call.

This particular embodiment corresponds for example to the case where the communication request sent in the step E1 by the terminal 15 is transmitted by the communications network 10 sequentially to the terminals 12 and 14. In this particular embodiment, in a first stage, the communication request is transmitted to the terminal 12. Then, after a given interval of time, if the terminal 12 has not established the communication requested with the terminal 15, the transmission of the communication request to the terminal 12 is cancelled. The cancelling of the transmission of the communication request is carried out in a known manner by the sending of a message SIP CANCEL to the terminal 12 (not shown) by the communications network 10. The communication request is then transmitted by the communications network 10 to the terminal 14 (step E4).

The representation illustrated in FIG. 3F allows it to be indicated to the user UA of the terminal 15 that the communication request is transmitted to a new terminal (terminal 14 represented by the icon 33) and that the terminal 12 (represented by the icon 34) is no longer ringing.

During a step E21, the terminal 14 picks up the communication request.

Following the pick-up in the step E21, during a step E22, the terminal 14 sends a message SIP 200 OK accepting the communication request addressed to the terminal 15. The SIP 200OK message notably comprises:
- in a "CallID" field, the series of characters identifying the communication requested, identical to the value of the "CallID" field of the SIP INVITE message sent by the terminal 15 during the step E1,
- in a "From" field, the address of the terminal 15 identical to the value of the "From" field of the SIP INVITE message sent by the terminal 15 during the step E1,
- in a "To" field, the public identity Id_B of the user UB and a "Tag" field identifying the terminal 14,
- in an SDP field, a list of session parameters relating to the terminal 14, such as the audio or video codecs supported by the terminal 14 and the IP addresses and connection ports used by the terminal 14 for receiving and sending the media data stream for the communication.

During the step E22, the communications network 10 receives the SIP 200OK message.

In a step E23, the communications network 10 sends, to the terminal 15, the SIP 200OK message received in the step E22. During the step E23, the terminal 15 receives the SIP 200OK message sent by the terminal 14 in the step E22.

Following the step E23, since the terminal 14 has accepted the communication request initiated by the terminal 15, during a step E24, the terminal 15 displays to the user UA information indicating that the communication request is accepted by the terminal 14 and not by the terminal 12. The displayed information is for example illustrated in FIG. 3I. FIG. 3I illustrates the screen 45 of the terminal 15 displaying an icon 35 representing the terminal 14 and the capacities 36 supported by terminal 14. In FIG. 3I, the icon representing the terminal 12 is no longer displayed.

Following the step E23, in a step E25, the terminal 15 sends to the terminal 14 an acknowledgement message SIP ACK. During the step E25, the communications network 10 receives the SIP ACK message. In a step E26, the communications network 10 sends to the terminal 14 the SIP ACK message received in the step E25.

During the step E25, the sending by the terminal 15 of the SIP ACK message to the terminal 14 allows the call establishment phase initiated by the step E1 to be terminated.

The communication is then established between the terminal 15 and the terminal 14 and the media data streams for the communication are exchanged during the step E27 between the terminals 15 and 14.

In a step E28, the communications network 10 cancels the transmission of the communication request to the terminal 12, by sending a message SIP CANCEL.

FIG. 4 illustrates a device 40 designed to implement steps of the method for establishing a communication according to one particular embodiment.

The device 40 comprises a storage module 42, for example a memory (MEM), a processing unit 43, equipped for example with a microprocessor (PROC), and controlled by the computer program (PG) 41 implementing the method for establishing a communication such as described in relation with FIG. 2. In the initialization step, the code instructions of the computer program 41 are for example loaded into memory (MEM) before being executed by the processor (PROC) of the processing unit 43. The processor of the processing unit 43 implements the steps of the method for establishing a communication initiated by the terminal 15 sender of a communication request to a shared public identity Id_B which is associated with at least two destination terminals 12 and 14, according to the instructions of the computer program 41. The processor of the processing unit 43 notably implements:

- a step for reception by the terminal 15 of at least one provisional response to the communication request, said provisional response originating from one of the two destination terminals 12 or 14,
- a step for obtaining, from the provisional response received, an address identifying the destination terminal which has sent the provisional response received,
- a step for sending a message to find out the capacities of a terminal to said destination terminal using the address obtained,
- a step for receiving a response message to the message to find out the capacities of a terminal, originating from the destination terminal, said response message comprising the capacities supported by the destination terminal,
- a step for displaying information representative of the capacities supported by the destination terminal.

The device 40 also comprises communication means 46. The communication means are for example implemented by a communication module (COM). The communication module notably allows the device 40 to establish communications via the communications network 10 in FIG. 1. The communication module (COM) allows messages to be sent and to be received from and to the terminals 12 and 14, via the communications networks 10.

The device 40 comprises display means 45 notably allowing information to be displayed that is representative of the capacities supported by the destination terminal according to one particular embodiment. The display means are for example implemented by a display module (AFF), such as a screen.

According to one particular embodiment, the device 40 is included within a terminal, such as for example the terminal 15 in FIG. 1. More generally, the device 40 is included within a terminal such as for example a personal computer, fixed or mobile, a mobile telephone, a tablet, an on-line television, a smartphone, etc.

Although the present disclosure has been described with reference to one or more examples, workers skilled in the art will recognize that changes may be made in form and detail without departing from the scope of the disclosure and/or the appended claims.

The invention claimed is:

1. A method for establishing a communication initiated by a terminal sending a communication request to a shared public identity which is associated with at least one first and one second destination terminal, wherein the method comprises the following steps performed by the terminal sending the request:
    a step of sending said communication request to the shared public identity, said communication request being received by at least said first and said second destination terminal,
    following reception of at least one first provisional response to the communication request, originating from said first destination terminal and one second provisional response to the communication request originating from said second destination terminal, for each first and second provisional response received:
        i. a step of obtaining, from the provisional response received, an address identifying the destination terminal which has sent the provisional response received,
        ii. a step of sending a message to find out the capacities of a terminal to said destination terminal using the address obtained,
        iii. a step of receiving a message in response to the message to find out the capacities of a terminal, originating from the destination terminal, said response message comprising the capacities supported by the destination terminal,
    a step of displaying information representative of the capacities supported by the first destination terminal and information representative of the capacities supported by the second destination terminal.

2. The method for establishing a communication according to claim 1, wherein the message to find out the capacities comprises a parameter to identify one dialog between the terminal sending the request and the destination terminal, said parameter being different from a parameter to identify one dialog comprised in the communication request.

3. The method for establishing a communication according to claim 1, furthermore comprising:
    a step of obtaining, from the provisional response received, information representative of a type of terminal corresponding to the type of the destination terminal having sent the provisional response received,
    a step of displaying said information representative of the type of the destination terminal, simultaneously with the display of the information representative of the capacities supported by the destination terminal.

4. The method for establishing a communication according to claim 1, wherein
    the display of the information representative of the capacities supported by said first destination terminal is carried out simultaneously with the display of the information representative of the capacities supported by the second destination terminal.

5. The method for establishing a communication according to claim 1, wherein, the reception of the second provisional response to the communication request originating from the second destination terminal is carried out after a given interval of time after the sending of the communication request, it comprises, simultaneously with the display of the information representative of the capacities supported by the second destination terminal, a step of modification of the display of the information representative of the capacities supported by the first destination terminal having sent the first provisional response to the communication request, so that to indicate that the first destination terminal does not ring anymore.

6. A device for establishing a communication initiated by a terminal sending a communication request to a shared public identity associated with at least two destination terminals, wherein the device comprises:
- means, which are activated following reception of at least one provisional response to the communication request originating from one of the at least two destination terminals, for obtaining, from the provisional response received, an address identifying the destination terminal having sent the provisional response,
- means for sending a message to find out the capacities of a terminal to said destination terminal using the address obtained,
- means for receiving a response message to the message to find out the capacities of a terminal, originating from the destination terminal, said response message comprising the capacities supported by the destination terminal,
- means for displaying information representative of the capacities supported by the destination terminal.

7. The device according to claim 6, wherein the device is a terminal.

8. A non-transitory computer-readable medium comprising a computer program stored thereon and comprising program code instructions for execution of a method for establishing a communication, when the program is executed by a processor, the communication being initiated by a terminal sending a communication request to a shared public identity which is associated with at least one first and one second destination terminal, wherein the method comprises the following steps performed by the terminal sending the request:
- a step of sending said communication request to the shared public identity, said communication request being received by at least said first and said second destination terminal,
- following reception of at least one first provisional response to the communication request, originating from said first destination terminal and one second provisional response to the communication request originating from said second destination terminal, for each first and second provisional response received:
  - i. a step of obtaining, from the provisional response received, an address identifying the destination terminal which has sent the provisional response received,
  - ii. a step of sending a message to find out the capacities of a terminal to said destination terminal using the address obtained,
  - iii. a step of receiving a message in response to the message to find out the capacities of a terminal, originating from the destination terminal, said response message comprising the capacities supported by the destination terminal,
- a step of displaying information representative of the capacities supported by the first destination terminal and information representative of the capacities supported by the second destination terminal.

* * * * *